(12) United States Patent
Desai et al.

(10) Patent No.: US 7,386,835 B1
(45) Date of Patent: Jun. 10, 2008

(54) TECHNIQUE FOR GRAPHICAL USER INTERFACE MODIFICATION

(75) Inventors: Munish T. Desai, Shrewsbury, MA (US); Brian R. Gruttadauria, Sutton, MA (US); Andreas L. Bauer, Maynard, MA (US)

(73) Assignee: EMC Corporation, Hopkinton, MA (US)

( * ) Notice: Subject to any disclaimer, the term of this patent is extended or adjusted under 35 U.S.C. 154(b) by 573 days.

(21) Appl. No.: 10/104,146

(22) Filed: Mar. 22, 2002

(51) Int. Cl.
G06F 9/44 (2006.01)
G06F 3/00 (2006.01)

(52) U.S. Cl. .................. 717/117; 717/107; 715/760; 715/762

(58) Field of Classification Search ............... 717/104, 717/105, 107, 117; 715/513, 760
See application file for complete search history.

(56) References Cited

U.S. PATENT DOCUMENTS

| | | | |
|---|---|---|---|
| 6,332,130 B1* | 12/2001 | Notani et al. ............... | 705/28 |
| 6,717,593 B1* | 4/2004 | Jennings .................... | 715/760 |
| 2002/0073091 A1* | 6/2002 | Jain et al. .................. | 707/100 |
| 2002/0085020 A1* | 7/2002 | Carroll, Jr. ................ | 345/700 |
| 2002/0156814 A1* | 10/2002 | Ho ............................ | 707/514 |
| 2003/0167278 A1* | 9/2003 | Baudel ....................... | 707/102 |

OTHER PUBLICATIONS

"Understanding DOM" Nicholas Chase. DeveloperWorks, Aug. 2001. http://www.ibm.com/developerworks.*
Darwin, Ian. "GUI Development with Java", May 1999, Linux Journal, Specialized Systems Consultants, Inc., pp. 1-11, as retrieved from the internet on Dec. 25, 2006 at //delivery.acm.org/10.1145/330000/327854/a4-darwin.html.*

\* cited by examiner

*Primary Examiner*—Eric B Kiss
(74) *Attorney, Agent, or Firm*—Krishnendu Gupta; Joel Wall; Robert Kevin Perkins

(57) ABSTRACT

A technique for easily making modifications to a graphical user interface (GUI). XML files each containing different rules for making a tree display are easily written by code developers. The files are merged into a document object model (DOM) stored in memory. The GUI display presentation can thus be easily updated by the code developers by modifying the rules stored in the DOM by merging additional XML files containing rule additions, deletions and/or modifications into the DOM. The DOM is parsed for certain object classes for which object instances are needed. The object instances having certain display properties are retrieved from the system or network with which the GUI is operative and are combined with certain display attributes or display rules stored in the DOM. The object instances including their display properties and attributes are returned to the GUI to be displayed on the terminal screen in accordance therewith.

36 Claims, 6 Drawing Sheets

DOM CONSTRUCTION

TREE CONSTRUCTION

TECHNIQUE FOR GRAPHICAL USER INTERFACE MODIFICATION

A portion of the disclosure of this patent document contains command formats and/or other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to computer program product, methodology, systems, and/or apparatus for making modifications to a Graphical User Interface (GUI) display and, more particularly, relates to a technique for allowing such modifications to be made in an extremely convenient and efficient manner because the code underlying the display is not modified.

2. Description of Prior Art

Most people who interact with the world of computers, computer networks, computer storage systems, etc., can probably be classified as users of this technology. Many, if not most of us, own personal computers (PCs) or use them at our jobs. We are Internet subscribers or users, and we take convenient advantage of technological advances which have been provided for us. We are enjoying the benefits of the computer revolution. However, there is a group set apart from ordinary users, a special subset of users who are also developers of this technology who have necessary skills and training to perform successfully in this competitive development activity. That subset of individuals (computer scientists, computer programmers, code developers, computer technologists, etc.) is constantly challenged. They are normally under great pressure to produce new product offerings having enhanced features within constraining deadlines, and the amazing growth of the computer industry is to a large extent a result of efforts by these individuals to meet these goals within these deadlines. Accordingly, these individuals, and perhaps software developers in particular, are strongly motivated to find ways or techniques to make their tasks easier.

One category of tasks confronting certain software developers is the category of modifying a large body of complex code that has been developed by a large developer team over a long period of time into a substantially fixed body of code. Any modification of that type of code usually ripples throughout the entire body of that code causing severe rework problems. These modifications can be inordinately frustrating and can take immense amounts of time to accomplish. In certain software development environments not only can there be many different products under development at the same time, but the specifications of these products may be continuously changing or evolving. Accordingly, there is a need to react quickly to these changes in direction to the product lines. When there are severe pressures to meet deadlines on a number of different development fronts, the last thing a development team needs is the large headache of rewriting one or more large bodies of code.

One example of this kind of complex code is that which controls the terminal screen presentation on a GUI in a computer system or computer network. The network may, for example, be part of a storage network or storage area network (SAN). And, the screen presentation may include toolbars with accompanying menus and menu items as well as displays such as graphs, maps or trees. Examples of these kinds of presentations and techniques for enabling them are disclosed in U.S. patent application Ser. No. 09/916,102 filed Jul. 26, 2001, entitled: "Plug and Play Interface for User Actions", having inventors Munish T. Desai, Brian R. Gruttadauria and Andreas L. Bauer, assigned to the assignee of the present invention, and hereby incorporated by reference herein in its entirety.

In one of those displays to which the term "tree" presentation or display is applied, one element in the tree is visually connected from another element in the tree somewhat reminiscent of a tree-branching, giving rise to the term. This display would be familiar to users of various commercially-available software packages, such as Microsoft's Windows Explorer® software. The element at treetop is normally called a "root node" or "parent" and elements connected directly below and from that root node are termed "children" of that root node. Children of that root node's children are "grandchildren" of the root node, etc., comprising the "descendents" of that root node. Any child node in the descendent hierarchy can be selected or considered as a "local root node" for its descendents. These displayed nodes, which are visible to computer users, are normally constructed within the computer system or network as software "objects" which are then handled or controlled by object-oriented software running in the system or network.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), JAVA, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.). These tangible objects (nodes) within the storage processor in the storage system can send messages to each other within the storage system and to other objects outside the storage system over the network with which they are operatively coupled. The relationship between these specific objects in the storage processor is usually visualized or characterized as the tree to which reference was earlier made. In this tree, many children may typically hang from the same parent. In addition to these kinds of tangible objects, logical units (LUNs) are other nodes or objects that can be contained within a tree. Also, the storage processor itself and/or the storage system itself can be objects and interact as individual nodes, respectively, with other nodes in their network.

The tree relationship of these node objects may be displayed in tree fashion on the terminal screen of the GUI. This display is controlled, in part, by a large, fixed body of complex code which "paints" this tree display on the terminal screen, and to which reference was made hereinabove. What is needed, therefore, is a convenient and efficient technique for use by software developers to modify their complex code responsive to requests by customers or to their own company directives, as new functionality which was not part of the original, arduous code development is discovered/developed and is sought to be added to the original. Embodiments of the present invention satisfy this need otherwise left unsatisfied by the prior art.

SUMMARY OF THE INVENTION

Embodiments of the present invention include computer program product, method, system and/or apparatus for modifying a graphical user interface (GUI) display in a manner that does not modify the code underlying the display.

In a first aspect of the present invention, a user display displaying a plurality of objects, or capable of displaying subsets of a plurality of objects, is controlled. The display, such as a tree display, is based on both underlying fixed code structure and modifiable rules which operate with the fixed code structure to modify the display. A plurality of rules governing relationships between each of the plurality of objects and certain of the objects is established. Responsive to a request from the user to change the display, certain of the rules to be used in effectuating the change is determined. Responsive to operation of these certain rules, other certain of the plurality of objects are retrieved and presented to the display in a manner to effectuate the change to the display, or expansion to the tree display. Also, the plurality of rules may be modified to effect retrieval of the certain, or yet other certain, of the plurality of objects in a manner to present them to the display in a different manner to effectuate a different change or different tree expansion. The display is thus modified (display of a first tree expansion is modified to display a different tree expansion) without modifying fixed code structure.

In another aspect, the GUI controls a display of no greater than a first plurality of objects. The display is based on underlying code structure as modified by rules stored in a composite merged file. The modification is made by modifying the rules without modifying the underlying code structure. A second plurality of rule files is established. A like second plurality of different sets of rules governing relationships between certain of the first plurality of objects is established in ordered sequence in a first language. Each one of the sets is contained, respectively, within one of the second plurality of rule files in ordered sequence. A document object model (DOM) is established. The like second plurality of different sets of rules is converted in the ordered sequence from the first language to respective different representations of the like second plurality of different sets of rules. Each of the different representations is written into the DOM concurrently with its being converted in the ordered sequence. The next successive one of each of the different representations is merged with each of the different representations until all of the different representations have been merged into the composite merged file, whereby the modification to the GUI is made without modifying (e.g., adding to, deleting from, or shifting portions of, etc.) underlying code structure.

In a further feature, a plurality of rules governing relationships between each of the plurality of objects and certain other of the plurality of objects is established in a basic XML file, and a DOM is established. The plurality of rules is converted into a representation of each of the rules. The representation is written into the DOM. Additional XML rule files are established in ordered sequence. Each of the additional XML rule files contains, or is capable of containing, additions, deletions, and/or modifications to at least a portion of the rules in the basic XML rule file, to provide modified XML rule files. The additions, deletions and/or modifications in each one of the XML modified rule files are converted sequentially into a like representation to obtain converted XML modified rule files. The converted XML modified rule files are merged with the representation of the basic XML rule file to obtain a plurality of merged files in a manner that each one of the converted XML modified rule files is merged with the immediately previous one of the plurality of merged files. This merging starts with the representation of the basic XML rules file and continues with each one of the converted XML modified rule files in the ordered sequence. This continues until all have been merged into the composite merged file in a manner that properly reflects all additions, deletions, and/or modifications. Thereby, the modification is made to the GUI without modifying the underlying code structure.

It is thus advantageous for software developers to employ embodiments of the present invention to enable software suppliers to easily add features to software that has been finalized, either before it has been shipped to customers or as revisions or upgrades to software product already in use by customers. It is also advantageous for customers to utilize software which embodies the present invention to enable any particular customer to request a particular GUI display modification having particular value for it, and thereby tailor its GUI display capability in accordance with its particular need and without experiencing any downtime for code modifications.

Objectives and other advantages of the present invention will be understood after referring to the detailed description of the preferred embodiments and to the appended drawings wherein:

DESCRIPTION OF THE PREFERRED EMBODIMENTS

FIG. 1

Client/Server Network

Figure 1:
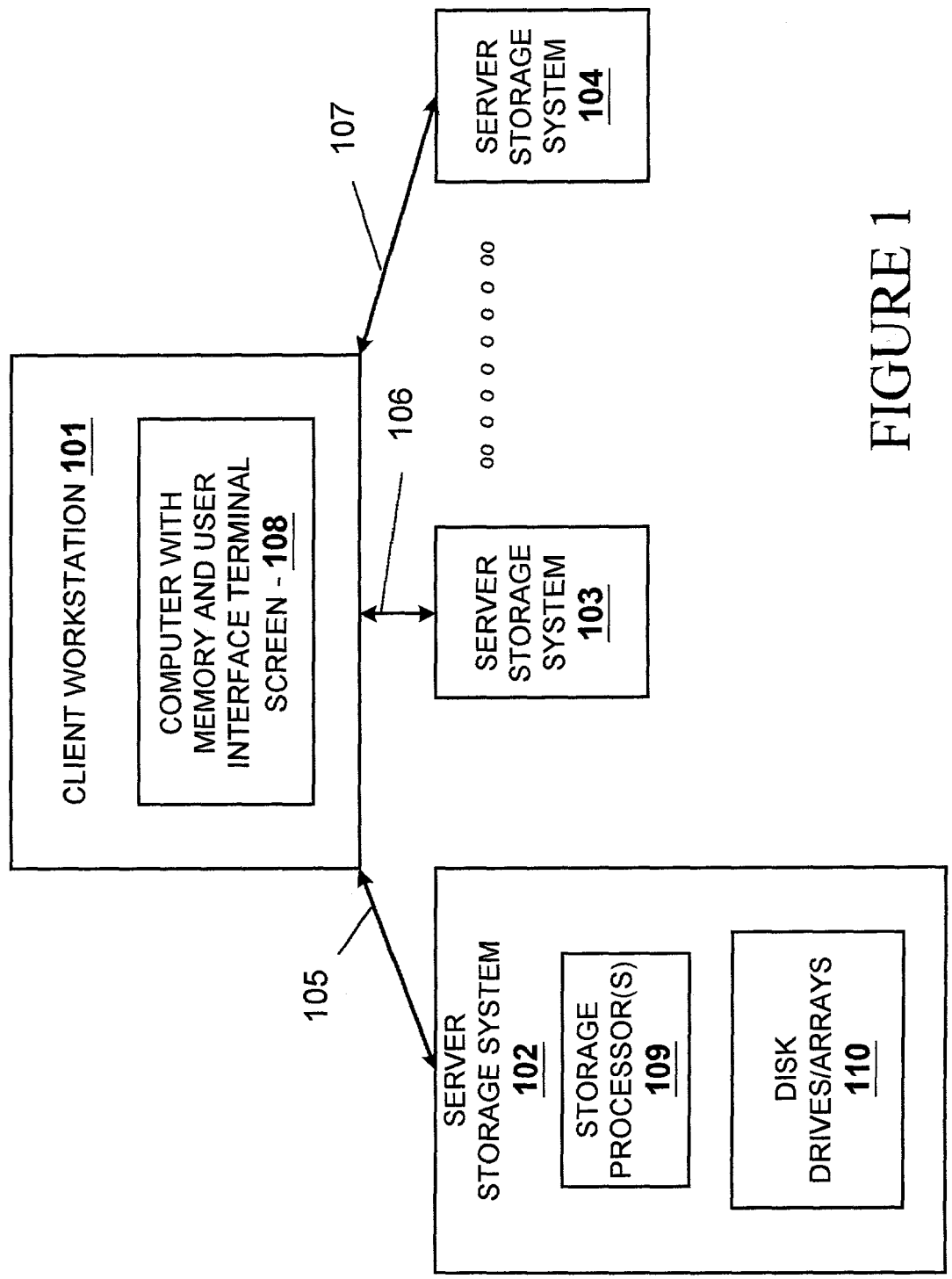
FIG. 1 is a block diagram of an exemplary client-server network showing a computer storage system in which embodiments of the present invention are particularly useful.

FIG. 1 is a block diagram of an exemplary client-server network showing a computer storage system in which embodiments of the present invention can be particularly useful, although it must be understood that embodiments of the present invention can be useful in any context in which a GUI is used. Client or client workstation 101 includes a computer having memory and a user interface (UI) terminal screen 108 which typically operates with keyboard and mouse (not shown) through which a human user can interact with the network. The server may be depicted as a storage system, and in this example multiple storage systems 102, 103, and 104 are shown. More than three storage systems can be used in this network as implied by the dots. The storage systems include at least storage processor(s) 109 and disk drives and disk arrays 110. Client workstation 101 is connected to server and storage systems 102, 103, and 104 via bidirectional buses 105, 106, and 107 respectively.

In a particular embodiment, the standard Internet hypertext transfer protocol (HTTP) may be used by the client to communicate with the arrays. Initially, at start-up, the UI portion of the software may be on one or more of the arrays. The software is just "housed" on the array but does not run on the array. In this embodiment, a user brings up its web browser software on its terminal and points it to the array(s) containing this UI portion of the software by typing the appropriate array address into the universal resource locator (URL) slot in the browser. The relevant software is then downloaded to the client workstation 101, and after that the software runs on the workstation. The present invention, in this particular embodiment, may thus operate within client 101, but its operation includes the obtaining of software objects, or instances of classes of software objects, from storage systems outside of the client in order to advantageously effectuate GUI display changes, as to be more fully explained hereinbelow. Alternatively, the software of the present invention could have been housed within the client workstation without effecting overall operation of the present invention.

FIG. 2

Schematic Block Diagram

Figure 2:
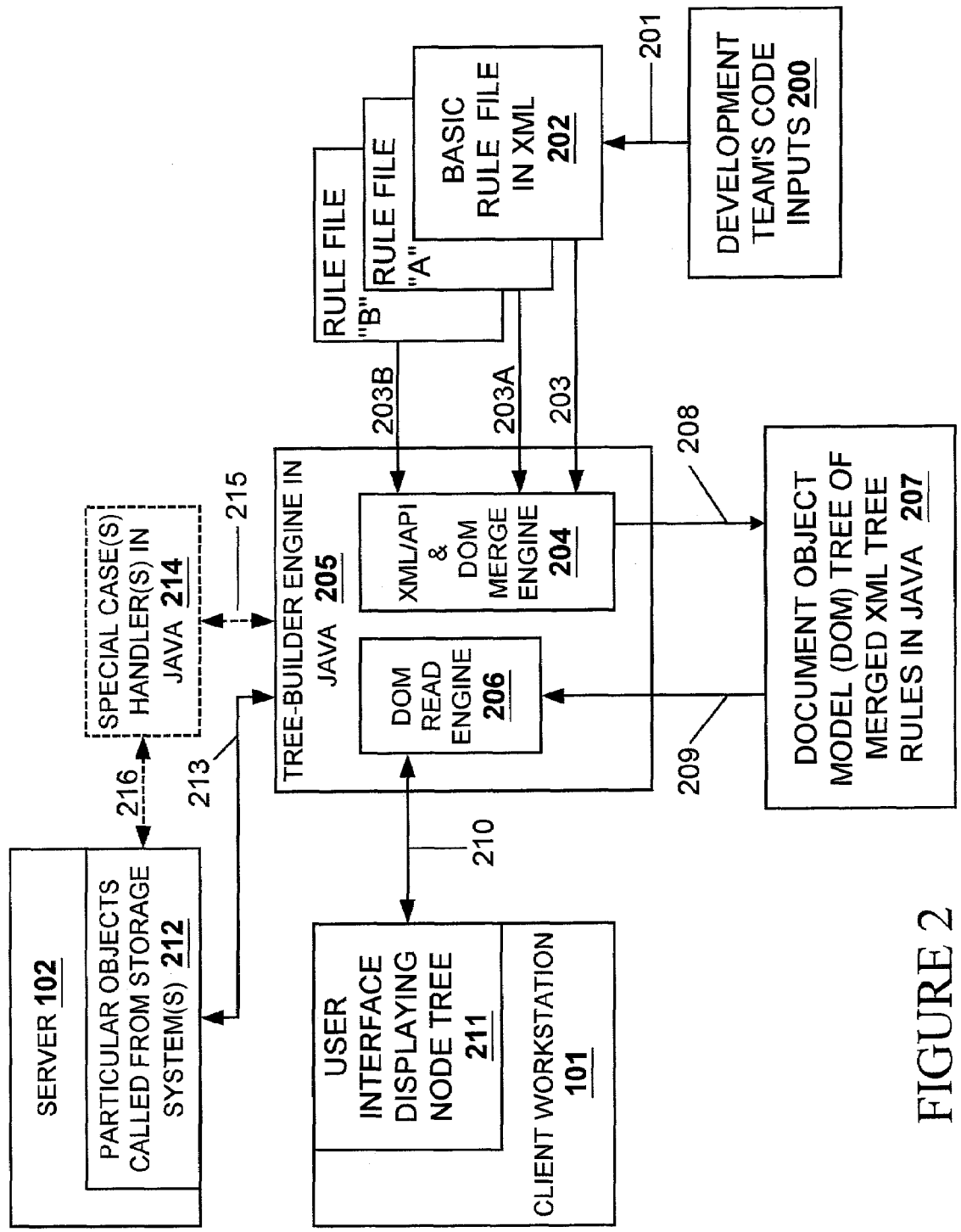
FIG. 2 is a schematic block diagram including an embodiment of the present invention within the context of the network of FIG. 1.
Figure 3:
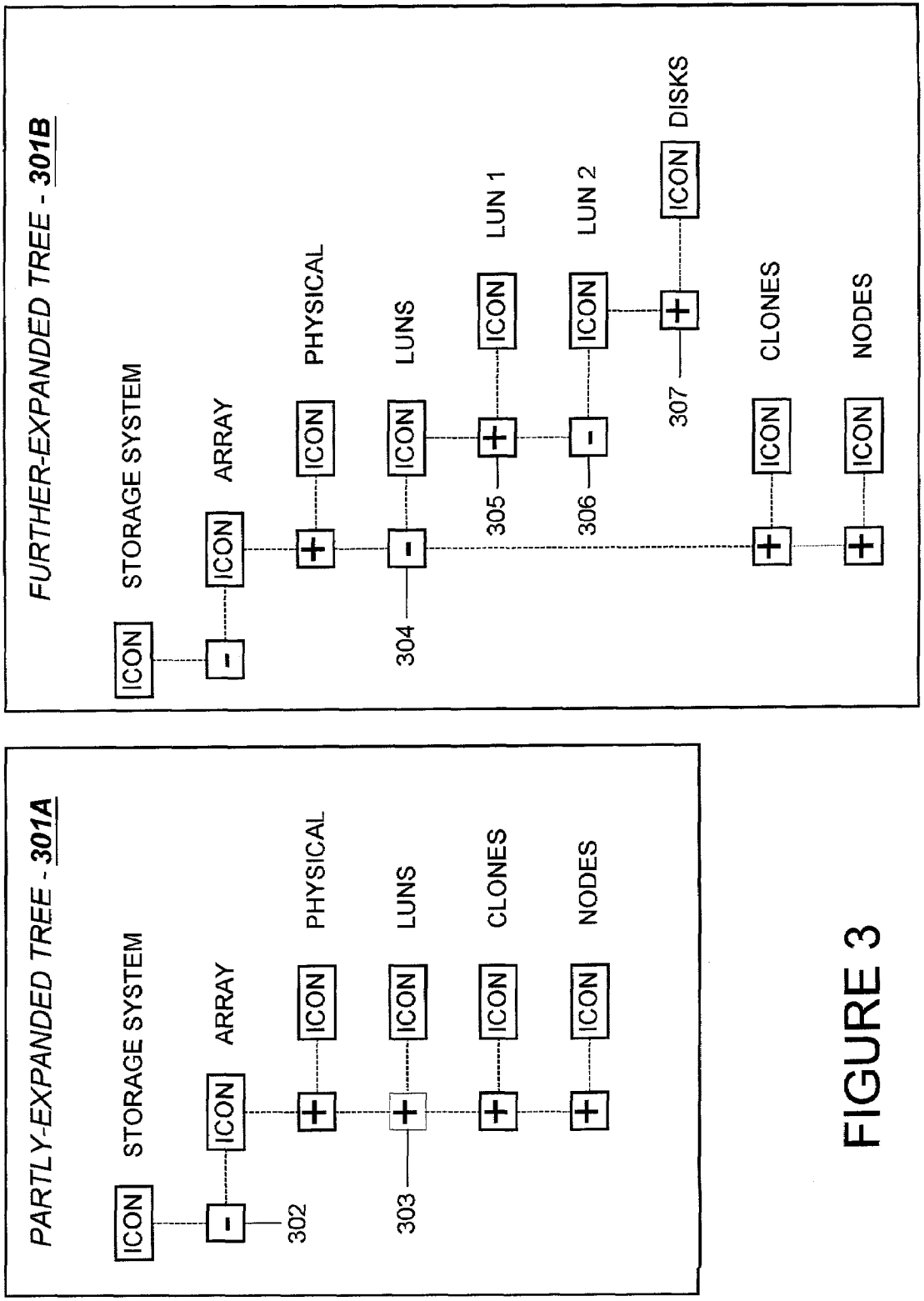
FIG. 3 is a schematic diagram of exemplary tree representations as they might be presented in a GUI display.

FIG. 2 is a schematic block diagram including software functionality embodied in the present invention within the context of the network of FIG. 1. At the left of the diagram, client workstation 101 of FIG. 1 is shown containing user interface 211 displaying, in this example, a node tree. [An example of a node tree is shown in FIG. 3 to be discussed hereinbelow.] Display formations presented in the GUI, other than tree formations, can also be modified utilizing principles of the present invention. At the upper-left of the diagram, server 102 of FIG. 1 is shown containing particular objects 212 which are called from the storage systems. The other functionality shown in the diagram, namely: tree builder 205 with its two engines 204 and 206, and document object model (DOM) 207, rule files 202, "A" and "B" and special case handler 214, each of which is operatively coupled to tree builder 205, is physically contained within either client workstation 101 or server 102 or both. This other functionality is shown outside thereof in FIG. 2 to enhance clarity of presentation but explanation regarding location of each functionality shall be provided below. DOM read engine 206 communicates with server 102 over links 213 or 215 via tree builder engine 205, to be discussed herein. There are two principal operations performed by this functionality: DOM construction and tree construction.

DOM Construction—Software Developer Input:

First, with regard to DOM construction, at the lower right of the diagram, software or code developers provide input into the network at inputs 200. These inputs from the developer team are keyboard inputs at client workstation 101 into basic rule file 202, and rule files "A" and "B". These files are eXtensible Markup Language (XML) files located on server 102. XML is an object-oriented language. Basic rule file 202 is prepared first and contains a sufficient number of statements in XML to enable the network or system, including its fixed code, with which it is operatively connected to display, in this instance, a node tree on a GUI which meets a first standard of presentation. In other words, a particular, limited set of presentation features are included within basic XML file 202 to meet this first standard. At a subsequent time, rule file A is prepared containing more features, more variability of presentation, or a re-arrangement of parent-child relationships as shown in the first presentation. And, at a time after that, rule file B is prepared containing additional features, presentation variability, etc. as compared with rule file A. These files are thus prepared in an ordered sequence (first basic file, next file A, and then file B), and many more rule files can be sequentially prepared beyond the three exemplified in FIG. 2.

The circumstances under which these files are prepared can vary. For example, in a first scenario, the code developers may have had all concepts for all three files in mind at the outset, and may have decided to divide them into three separate files to enable a planned roll-out in "A" and "B" stages of upgrades for marketing purposes. Or, in a second scenario, the concepts that differentiate file A from the basic XML file may not have been developed until long after the basic XML file was prepared and tested, but prior to shipment, where file A represents a necessary improvement that must be included or represents correction of an error that was later discovered in the basic XML file, etc. In either scenario, these files are processed by tree builder engine 205 and both scenarios shall be considered as follows.

Tree builder engine 205 is JAVA software which includes two other JAVA software engines: DOM merge engine 204 and DOM read engine 206. This software is initially housed on the disk(s) in server 102 and is then downloaded into client workstation 101 as earlier described. Merge engine 204 reads or parses XML file 202, file A, and file B over operative connections 203, 203A, and 203B respectively and writes them into a document object model (DOM) 207 in memory located in either client workstation 101 or in server storage system 102. A DOM is an in-memory representation of XML data, defining what attributes (boldface highlighted in text herein) are associated with each object in the DOM, and how these objects and attributes can be manipulated. In this case, the DOM may be written in JAVA language and the in-memory representations are manifested or expressed as JAVA statements. Accordingly an application program interface (API) is used that interfaces between the XML language of the rule files and the JAVA code from which or with which the DOM is constructed.

Under the first scenario above, a JAVA representation of basic XML file 202 is written into DOM 207 alone because rule files A and B were being intentionally held back for marketing strategic purposes. (This is not dissimilar to a modular concept, where each additional XML file can be viewed as a module to be plugged-in or added to the basic XML file.) Accordingly, when the features in rule file A are rolled-out in a marketing-upgrade presentation, rule file A is parsed by merge engine 204 and is written into DOM 207. A JAVA representation of XML rule file A is thus merged with the JAVA representation of basic XML file 202 previously stored in DOM 207. This creates a "merged-basic" file. A similar operation subsequently occurs in the ordered sequence with XML rule file B, where a JAVA representation of rule file B will be merged with the merged-basic file (the merged-combination of rule file A and basic rule file 202) previously stored in DOM 207. This creates a new merged-basic file, and with each additional file that may be added, a subsequently new merged-basic file is born.

Under either scenario, the parsing and merging operation proceeds in a similar manner from the viewpoint of the present invention. The only material difference may possibly be a greater time period between parsing and merging the three files in the ordered sequence under scenario A than under scenario B. In scenario A, the customer's software may be upgraded over a relatively long period of time in multiple marketing roll-outs. In scenario B, the customer uses a single version of the XML software, possibly upgraded over a relatively short period of time. However, regardless of scenario A or B, or some other scenario, it should be understood that each subsequently written XML file essentially contains contents of its immediately previous XML file along with certain modifications which make the subsequently written file different from the previous file.

For example, starting with basic file 202, additional file A, when written, contains basic file 202; and, additional file B, when written, contains the combination of file A and the basic file. (File A and the basic file may or may not have been merged yet.) However, after the merging process begins, and as subsequently written files are being merged with the basic or merged-basic files by merge engine 204 into DOM 207, only certain differences between each subsequent file and its prior merged-basic file are noted and merged by merge engine 204. Each file is constructed as a hierarchy of objects or nodes, and differences between files are between object attributes or characterizations contained within the respective nodes in each file. A merged-basic file can be referred to as a "composite merged file" after all of its component XML files have been parsed, converted/translated into JAVA representations, and merged together in the DOM. These certain differences are flagged by a particular object attribute, namely: nodeId="_" contained in a node in the file to be merged, and are further flagged by a match between these nodeId="_" attributes contained in nodes of both files at the same tree depth. Two nodes are at the same tree depth if they are at the same number of parent-child counts from their respective root nodes. More detail about attributes, this particular attribute and this merging process are provided in connection with discussion of flowcharts hereinbelow. But first, the other principal function of FIG. 1 shall be discussed.

FIG. 2 (Continued) and FIG. 3

Tree Display

Tree Construction—Network User Input:

In order to invoke the tree construction aspect of the present invention the network user, operating through client workstation 101, has to make a request of the depicted functionality to construct a tree. Consider the user to be displaying a particular tree of objects or nodes from the client-server system of FIG. 2 on its terminal. This tree of objects would be a subset of the entire plurality of objects in the system each of which the system is capable of displaying but only in groups or subsets of objects. The user calls into play the operation of the functionality shown in FIG. 2 when the user expands the displayed tree. For example, consider the tree of objects in FIG. 3, which is a schematic diagram of two exemplary tree representations, 301A and 301B, as they might be sequentially presented in a GUI display.

In display 301A a partly-expanded tree is shown. Button 302 alongside the "ARRAY" icon had earlier been left-clicked-on (using mouse, cursor, and terminal screen in the ordinary fashion) which converted what was the button's positive (+) sign to the negative (−) sign shown. Simultaneously with the activity of left-clicking on button 302, an expansion of the tree had occurred, which enabled children of parent ARRAY to be displayed, namely children: "PHYSICAL", "LUNS", "CLONES", and "NODES". If any of the buttons associated with any of these children is then left-clicked-on, that button will convert from positive (+) to negative (−) and show a further expansion of the tree. For example, if button 303 is left-clicked-on, the tree is further expanded as shown in display 301B. (As will be understood, displays 301A and 301B appear sequentially and not simultaneously on the terminal screen.) In display 301B, button 304 which shows a negative sign (−) is the former button 303 which had showed a positive (+) sign prior to its being left-clicked-on. Button 304 is associated with the LUNS child node of the ARRAY parent node. The LUNS node expands to show its two children, namely: LUN 1 and LUN 2 having buttons 305 and 306 respectively. In similar fashion, button 306 was subsequently clicked on which turned it from positive (+) to negative (−) while it expanded to show one child of LUN 2, namely: "DISKS" with its button 307 as shown. Embodiments of the present invention enable construction or building of these tree displays in a particularly advantageous manner, readily enabling the software developers to easily modify details of the tree display. The software developers can add nodes, delete nodes, rearrange nodes from child status to parent status and vice versa, or reposition nodes from being children of one or more parents to being children of another parent or parents. This ready modification is accomplished as follows.

Initially, consider the user to click-on button 302 in display 301A, thereby requesting or instructing the system to build a tree under ARRAY and to convert button 302 to the negative (−) sign shown. Prior to the initiation of such tree construction and button conversion, this user request or instruction must be processed by tree builder engine 205. The information for building this tree is contained in two places, namely: (1) tree-builder engine 205 which contains a large body of fixed code responsible for building the framework of a basic or generic tree display and which code is not subject to variation, and (2) DOM 207 which contains code (an in-memory representation of the tree) responsible for detail of the tree display and which is subject to variation in accordance with XML file merging procedures outlined above. The fixed code in tree-builder engine 205 and the variable code in DOM 207 are both written in JAVA language in this example, although other object-oriented languages could have been used such as C++.

The user's request (as the user clicks-on button 302 in display 301A) is operatively coupled over bidirectional bus 210 to DOM read engine 206. DOM read engine correctly interprets this request as a command to provide information back to user interface 211 to enable it to form the appropriate tree display. DOM read engine 206 then consults (reads or parses) DOM 207 to obtain the relevant tree building rules for this particular tree, because DOM 207 is an in-memory representation of the most up-to-date XML rule file (composite merged file) as coded in JAVA. There are a large variety of attributes that are coded into the XML files when they are written by the code developers, representations of which comprise DOM 207 in a JAVA context. (Among other things, XML statements comprise headers, tags, elements, and attributes. The header is basic identification, tags are metadata attached to an element that defines the boundaries of element content and sometimes can be the greater than (>) and less than (<) signs or can be something else, elements are basic building blocks and are similar to nouns in ordinary human language, and attributes are like adjectives that describe the noun elements. There is much more to XML than this brief outline and available from any good XML text, such as "XML: A MANAGER'S GUIDE", by Kevin Dick, Addison Wesley publisher.) Consider two examples of these XML attributes:

node enumerator="EV_Array" is a statement in XML which shows "node" as a tag, "enumerator" as an attribute, and "EV_Array" as the value of enumerator, a representation of which may be coded in JAVA in DOM 207. As noted, the quantity within the quotation marks is the "value" of the enumerator attribute, and at runtime, (when the user makes a request), if this is a relevant attribute for this particular tree being built in response to this particular user request, it shall be taken into account in obtaining the relevant tree building rules and object information for this particular tree.

nodeBuilder="Array" is another statement in XML which shows "nodebuilder" as an attribute, a representation of which may be coded in JAVA in DOM 207. Again, the quantity within the quotation marks is the "value" of the nodeBuilder attribute, and at runtime, if this is a relevant attribute for this particular tree being built in response to this particular user request, it shall be taken into account in obtaining the relevant tree building rules and object information for this particular tree.

The information stored in DOM 207 is general information about parent-child relationships in node tree format and reflective of merged XML files written by the code developers. Therefore, the general information being obtained in response to this instant parsing of DOM 207 is about types of objects to be shown under each particular node in this particular tree display. This obtained general information thus defines classes of software objects, not instances of software objects. In order to properly respond to the user's request, particular software object instances must be obtained for the objects in this particular tree. These software object instances are located in server storage system 102, and more specifically may be located in storage processor(s) 109 and/or disk drive or disk arrays 110. DOM read engine 206 utilizes the two attributes exemplified above to decide how to obtain these software object instances. In other words, since the user is building tree 301A in FIG. 3, which, in this example, is a tree representation of a portion of a storage system (and is a subset of all nodes in the system capable of being displayed), and since the tree calls for visual representations of either physical, logical or some other kind of software objects from that storage system, then instances of each of those objects (including their respective properties) must be somehow retrieved by read engine 206 in order to marshal sufficient information to properly respond to the user's request to enable the GUI to complete the display.

Accordingly, when attribute enumerator="EV_Array" is parsed, if it is relevant to this particular tree being built (if it is in the hierarchy as the user-clicked-on local root node or its descendent) enumerator represents a command for DOM read engine 206 to call particular objects 212 directly over bidirectional link 213. The called or retrieved object instances are thus returned to DOM read engine 206 and are processed therein. The processing involves combining the retrieved instances of these objects including their properties such as "name" (e.g., labelProperties="Name,ModelNumber"), "state", "capacity", etc. with their appropriate attributes which DOM read engine 206 obtains from DOM 207 for their corresponding object classes. Attributes (e.g., label="LUNs", icon="luns_icon.jpg") may include: how to display the object in the tree, which icon to use, what particular look to give to the icon, etc. Read engine 206 then forwards this processed information as an array of attributed object instances having specific properties to UI 211 over link 210. UI 211 uses this array of attributed object instances, which may be sets of information such as class type, icon to be displayed, labels to be displayed, text to be displayed, etc., for rendering the appropriate tree display on its terminal screen.

However, when attribute nodeBuilder="Array" is parsed, if it is relevant to this particular tree being built (if it is in the hierarchy as the user-clicked-on local root node or its descendent), nodeBuilder represents a command for DOM read engine 206 to arrange with Special case(s) handler(s) 214 to call particular objects 212 directly over bidirectional link 216, and then to return their instances to DOM read engine 206 over bidirectional link 215 for processing therein. Special handler 214 is specialized code which is also specified in the XML files and thus specified in DOM 207. Read engine 206, as it parses nodeBuilder, has the ability to initiate the execution of this specialized code. In other words, when attribute nodeBuilder is parsed, regardless of the value of the attribute, read engine 206 instantiates or invokes the class that is the value of that attribute which is the location of that JAVA class and which brings special handler 214 into the object-instance retrieving operation. DOM read engine 206 and tree-builder engine 205 may not have sufficient processing capability to call certain objects directly under certain conditions; a provision is made for these special arduous cases with handler 214 which is occasionally brought into operation as required. Special handler 214 comprises special code or logic embodying special algorithms capable of handling special or extraordinary tasks and is invoked or instantiated on a relatively infrequent, and as-needed, basis. Handler(s) 214 may be multiple in number, each one being designed to handle one or a few conditions, and it and its bidirectional buses 215 and 216 are shown schematically in dashed line format to suggest that their usage may be less frequent than communication over bidirectional bus 213.

Recapitulating, when the user expands a node in the tree, UI 211 consults with DOM read engine 206 over bus 210. DOM read engine 206, in turn, consults with DOM 207 and performs a lookup of the node which the user clicked-on. DOM read engine 206 finds the children object classes associated with the user-selected node (the parent or local root node for this particular tree). Since these children objects are classes and not instances, DOM read engine 206 needs to obtain detailed information about these children from sources of this information which are located on the storage system. After these software object instances are returned to DOM read engine 206 by one of two paths noted above, it processes this information by combining or "packaging" each object instance having certain properties related to that object instance and forwards the combination as an array of "propertied object instances" to UI 211 over link 210 in accordance with the tree "rules" in the DOM. UI 211 uses this array, which may be sets of information such as class type, icon to be displayed, labels to be displayed, text to be displayed, etc., for rendering the appropriate tree display on its terminal screen.

With reference to further-expanded tree 301B in FIG. 3, an example of XML code allowing that presentation is shown in Table I.

TABLE I

EXAMPLE OF BASIC XML CODE FOR TREE OF 301B

```
<?xml version="1.0"?>
<node label="Storage Systems"
    icon="storage_system_icon.jpg"
    folder="true"
    nodeId="Storage Systems Folder">
    <node enumerator="EV_Subsystem"
        enumeratorProperties="Name,State,Type"
        nodeClass="EV_Subsystem"
        labelProperties="Name"
        nodeId="Subsystem">
        <node folder="true"
            label="Physical"
            icon="physical_icon.jpg"
            nodeId="Physical Folder">
        </node>
        <node folder="true"
            label="Luns"
            icon="luns_folder_icon.jpg"
            nodeId="LUNs Folder>
            <node enumerator="EV_LUN"
                enumeratorProperties="Name,Type,State,Capacity,LunNumber"
                nodeClass="EV_LUN"
                labelProperties="Name,LunNumber"
                nodeId="LUN">
                <node label="Disks"
                    icon="disks_icon.jpg"
                    folder="true"
                    nodeId="Disks Folder">
                </node>
            </node>
        </node>
        <node folder="true"
            label="Clones"
            icon="clones_icon.jpg"
            nodeId="Clones Folder>
        </node>
    </node>
</node>
```

In Table I (and in Table II hereinbelow), a number of attributes are shown which is a subset of all attributes that may be used in the XML files associated with embodiments of the present invention. In these Tables, node is the tag name; all tags have the name "node" in these examples; folder is an attribute that indicates that the corresponding tree node is a folder; label is an attribute that indicates the tree node has the string-value as the label; icon is the attribute that specifies the name and location of the file that contains the picture to show in the tree node [next to the (+) or (−)]; nodeId is the attribute whose value uniquely identifies the XML node from all other nodes at the same level in the hierarchy; enumerator is the attribute whose value indicates to the read engine what operation to perform in order to retrieve the objects from the server; enumeratorProperties is the attribute whose value indicates what properties should be returned in the objects specified in enumerator; and, labelProperties is an attribute the value of which indicates names of properties to be used to form the label in the tree node and is a subset of the properties indicated in enumeratorProperties.

The display in 301B having local root node "ARRAY" is easily modified to some other hierarchy having the same local root node, in accordance with principles of the present invention discussed earlier in the "DOM CONSTRUC-TION—SOFTWARE DEVELOPER INPUT" section. A modification to the XML file containing the code of Table II (i.e., basic rule file 202) is made by writing an additional XML file (i.e. additional rule file "A"). For example, to remove "PHYSICAL" from its current location as a child immediately under "ARRAY" and to move it to some other position where it would then be a child under "CLONES", the XML statements in Table I can be modified to the statements in Table II, as shown:

TABLE II

MODIFIED XML CODE FOR MODIFIED TREE OF 301B

```
<?xml version"1.0"?>
<node label="Storage Systems"
    icon="storage_system_icon.jpg"
    folder="true"
    nodeId="Storage Systems Folder">
    <node enumerator="EV_Subsystem"
        enumeratorProperties="Name,State,Type"
        nodeClass="EV_Subsystem"
        labelProperties="Name"
        nodeId="Subsystem">
        <node folder="true"
            label="Luns"
            icon="luns_folder_icon.jpg"
            nodeId="LUNs Folder>
            <node enumerator="EV_LUN"
                enumeratorProperties="Name,Type,State,Capacity,LunNumber"
                nodeClass="EV_LUN"
                labelProperties="Name,LunNumber"
                nodeId="LUN">
                <node label="Disks"
                    icon="disks_icon.jpg"
                    folder="true"
                    nodeId="Disks Folder">
                </node>
            </node>
        </node>
        <node folder="true"
            label="Clones"
            icon="clones_icon.jpg"
            nodeId="Clones Folder>
            <node folder="true"
                label="Physical"
                icon="physical_icon.jpg"
                nodeId="Physical Folder">
            </node>
        </node>
    </node>
</node>
```

As can be seen, the only difference between the tables I and II is the repositioning of the following XML code:

```
<nodefolder="true"
    label="Physical"
    icon="physical_icon.jpg"
    nodeId="Physical Folder">
</node>
```

(also shown in bold italics in Tables I and II only for purposes of making it easily identifiable) from its old location in Table I [e.g., from Basic Rule File 202, FIG. 2] to its new location in Table II [e.g., into Rule File A, FIG. 2]. This relatively small modification, made by way of XML file updating, will enable the display of FIG. 301B to forevermore show "PHYSICAL" as a child of "CLONES" instead of as a child of "ARRAY" until either the user requests the software supplier, or the software supplier unilaterally decides, to again modify the display by way of yet another XML rule file [e.g., Rule File B]. This is a simple example to illustrate the ease with which embodiments of the present invention can enable modifications to the display; it should be understood that very complex modifications to the display can also readily be accomplished by these same techniques.

FIG. 4

DOM Construction Flowchart

Figure 4:
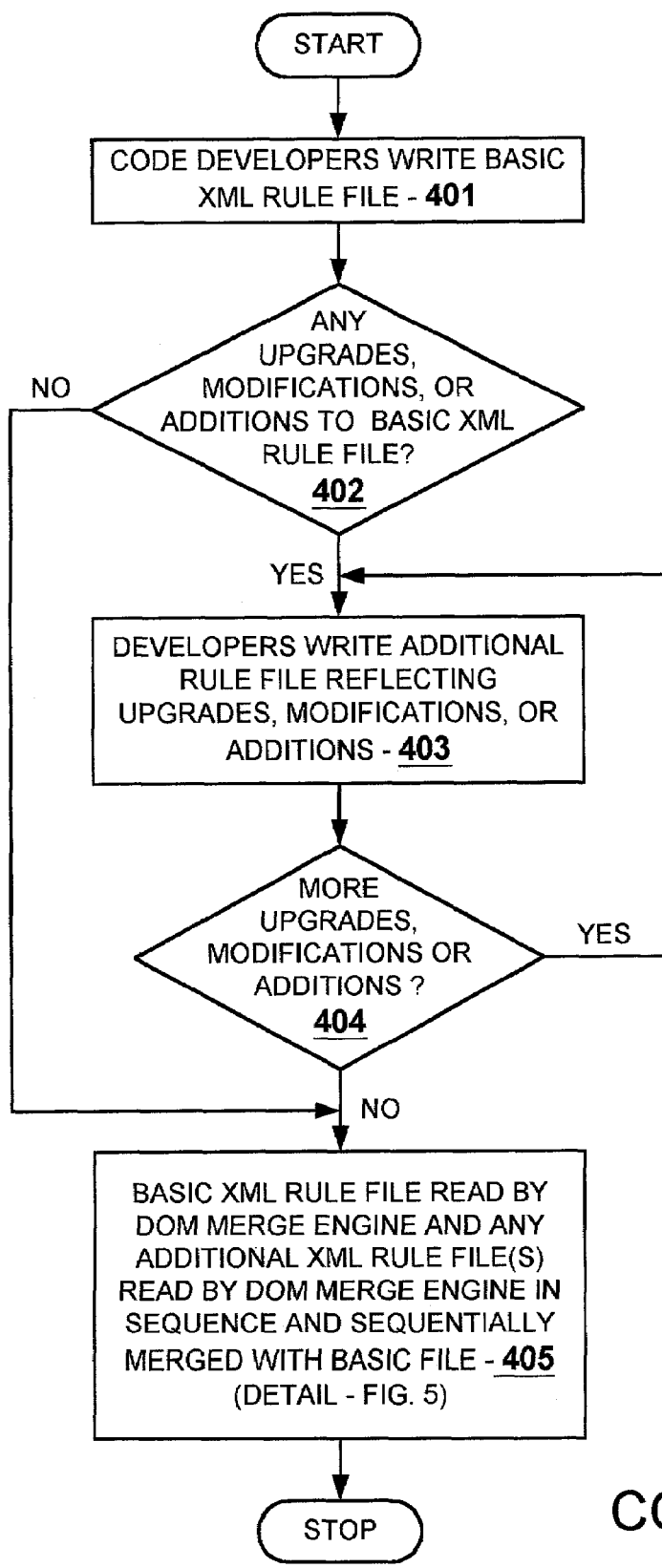
FIG. 4 is a flowchart depicting an algorithmic process for constructing the DOM of FIG. 2 in accordance with principles of the present invention.

FIG. 4 depicts an algorithm for constructing DOM 207 of FIG. 2 in accordance with principles of the present invention. In block 401 code developers write the basic XML rule file, for example, as shown in Table II. It should be understood that this file can be very long and include XML statements to cover a large number of software object classes of varying kinds (physical, logical, etc.) along with large numbers of attributes for each of these object classes. The XML rule file itself has a tree-like layout (as can be seen in Tables I and II), with a child node or object being shown indented-to-the-right from its parent node, in a manner not dissimilar from a GUI tree display that reflects a portion of this XML file. In decision block 402 the query is posed: are there any modifications, upgrades, or additions to this basic XML rule file? If the answer is "no", the algorithmic process moves to block 405 where the basic XML rule file is read by DOM merge engine 204, written into DOM 207 in JAVA, and the process stops. But, if the answer is "yes", in block 403 developers write an additional rule file reflecting modifications, upgrades or additions (for example, the file in Table II).

In block 404 the query is posed: are there are more modifications, upgrades, or additions? If "yes" the procedures in blocks 403 and 404 loop once for each additional XML rule file that is generated. Each iteration could cover, for example, a new marketing enhancement such as in the roll-out first scenario earlier described, or could cover a bug fix or feature enhancement by code developers prior to first shipment of product as in the second scenario earlier described. But, if "no", then the algorithmic process moves to block 405. Therein the basic XML rule file and additional XML rule file or files, depending on how many iterative loops are taken in steps 403 and 404, are sequentially read by DOM merge engine 204 and sequentially merged by DOM merge engine 204 with the basic file. This sequential operation creates interim "merged-basic" files which finalize into one "composite merged file". Detail of operation of block 405 is provided in FIG. 5.

FIG. 5

Merge Engine Flowchart

Figure 5:
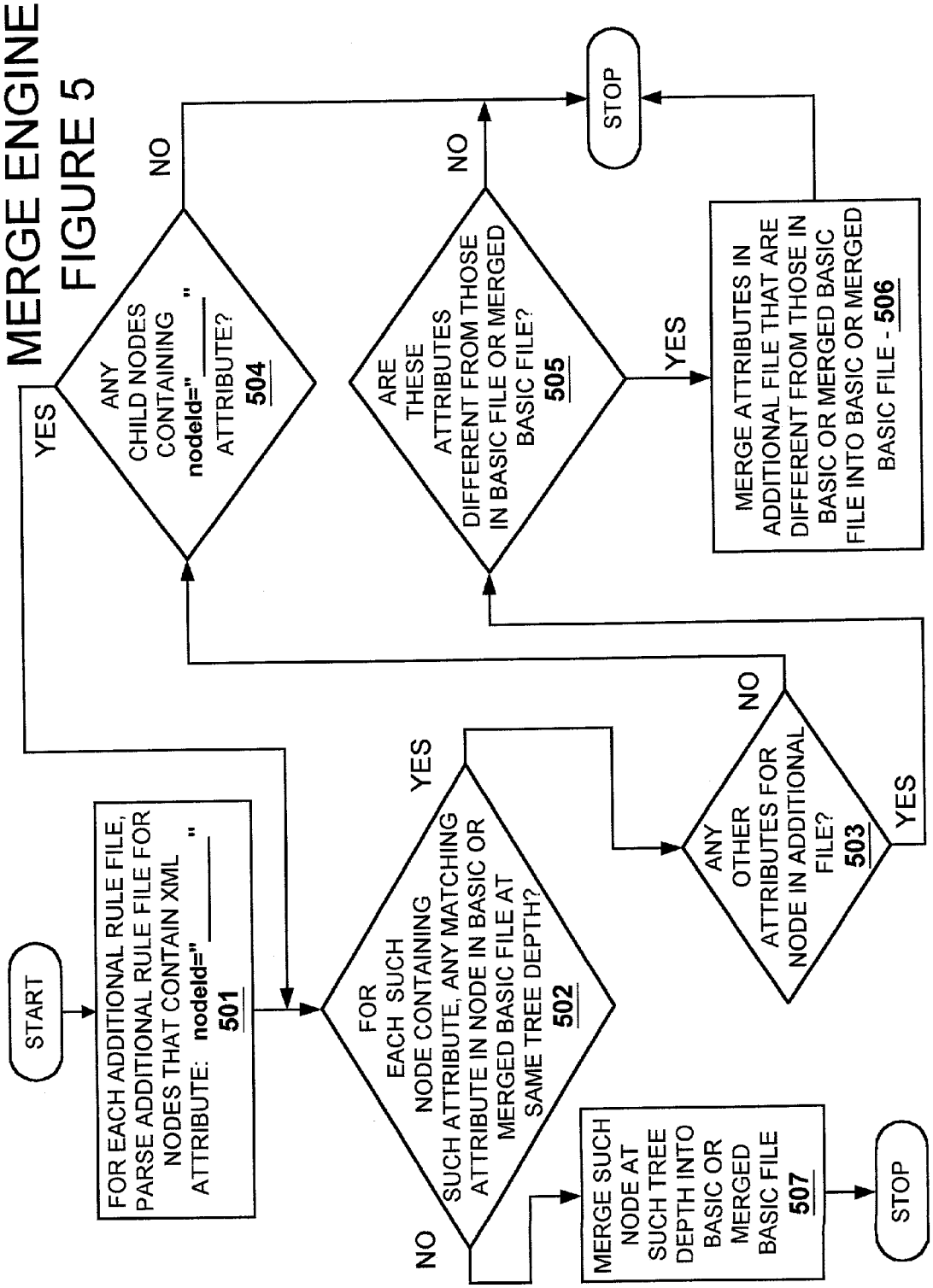
FIG. 5 is a flowchart depicting an algorithmic process for the merge engine of FIG. 2 as utilized in FIG. 4, in accordance with principles of the present invention; and, FIG. 6 is a flowchart depicting an algorithmic process for constructing the tree display on the GUI of FIG. 2 in accordance with principles of the present invention.

FIG. 5 is a flowchart depicting detail of the algorithmic process of block 405 in FIG. 4, for DOM merge engine 204 of FIG. 2. In block 501, each additional rule file (such as rule file A, rule file B, etc. of FIG. 2) is parsed in ordered sequence for nodes containing the aforementioned particular XML attribute: nodeId="_". In other words, for each additional rule file, such file is read from beginning to end by merge engine 204 to find each occurrence of a node containing this attribute. Each file's reading or parsing is performed sequentially with a subsequent file being read or parsed only after the parsing of its prior most previous file is completed (e.g., rule file B's parsing starts after rule file A's parsing is completed). The value of this attribute (the quantity in the quotation marks for which a space is provided herein) is important because a match between values of nodeId attributes is sought.

In decision block 502 the query is posed: for each such node containing such attribute, does a matching attribute exist in a node in the basic rule file (or the prior most previous merged-basic rule file depending on iteration) at the same tree depth? In other words, for one node in a basic or merged basic rule file located at a particular number of parent-child steps from its topmost root node and for another node in an additional rule file and located at the same number of parent-child steps from its topmost root node, is there a match between two nodeId attributes contained in these nodes, the attributes having identical attribute values? If "no" the algorithmic process moves to block 507 wherein the entire node (including the node's descendents) in the additional rule file to be merged, which contains that unmatched nodeId attribute, is merged into the basic or merged basic file at that same tree depth. In other words, that entire node including its children, etc. is merged into the node in the basic or merged basic file with which a nodeId attribute match was sought. This particular merging covers the situation where a brand-new node was written into the additional file, as would occur when a brand-new feature is being offered in a new revision (rev) of that software product. After that merging, the process stops for that node.

But, if "yes" then a nodeId="_" match was found in the two nodes. The algorithmic process then moves to decision block 503 wherein the query is posed: are there any other attributes in the additional file contained by the node at this tree depth (i.e. in the node in which the nodeId attribute appeared)? These other attributes, if they exist, are different from nodeId and contain display rules for this node or object class. On the one hand, if the answer to decision block 503 is "no" the algorithmic process moves to decision block 504 wherein another query is posed: are there any child nodes that contain the nodeId attribute? In other words, do any children of the node in decision block 503 (i.e., the node containing the matching nodeId attribute) exist which contain a nodeId attribute? If the answer to decision block 504 is "no", where there are no such children of the node in block 503, or where there are such children but they do not have a nodeId attribute, then the merging process of FIG. 5 stops for this node. There are simply no attributes to merge into the prior most previous file for this node, although the matching nodeId attribute condition from block 502 directed or suggested such merging to take place. There are no attributes in the additional file in this node to merge (decision block 503) and there are no children of this node which have attributes to merge (decision block 504). Note that there may be siblings of this node (which would appear at the same tree depth, or same number or parent-child steps from the root node, as this node) which may contain attributes to merge. Each sibling will be processed in turn; the merging process stops for this node only. But, if the answer to decision block 504 regarding child nodes is "yes", then there is at least one child node of this node which contains a nodeId attribute. Accordingly, the process returns to decision block 502, whereby the same process of blocks 502, 507, 503 and 504 repeats for this at least one child node and may repeat, in iteration, as many times as may be required.

On the other hand, if the answer to the query posed in decision block 503 is "yes" (i.e.: there are other attributes in the additional file for this node at this tree depth), the process then moves to yet another decision block, block 505, wherein the query is posed: are these other attributes (i.e., attributes contained within this node in block 503) different from those in the basic file or the prior most previous merged-basic file at a corresponding tree depth? If the answer is "no", then the process of FIG. 5 again stops for this node because attributes that are the same need not be merged—they already exist at this tree depth in the "matching" node in the basic or prior most previous merged-basic file. But, if the answer is "yes", the attributes are different, (i.e., different attributes do exist in nodes containing matching nodeId attributes at the same tree depth) and then the process moves to block 506 where only those different attributes are merged. Nodes containing attributes which would otherwise be identical but for unequal values are considered not to be different from each other and are therefore not merged. As noted, this merging process of FIG. 5 is repeated for each node for each rule file in ordered sequence until all additional XML files are parsed and merged into the composite merged file.

FIG. 6

Tree Construction Flowchart

Figure 6:
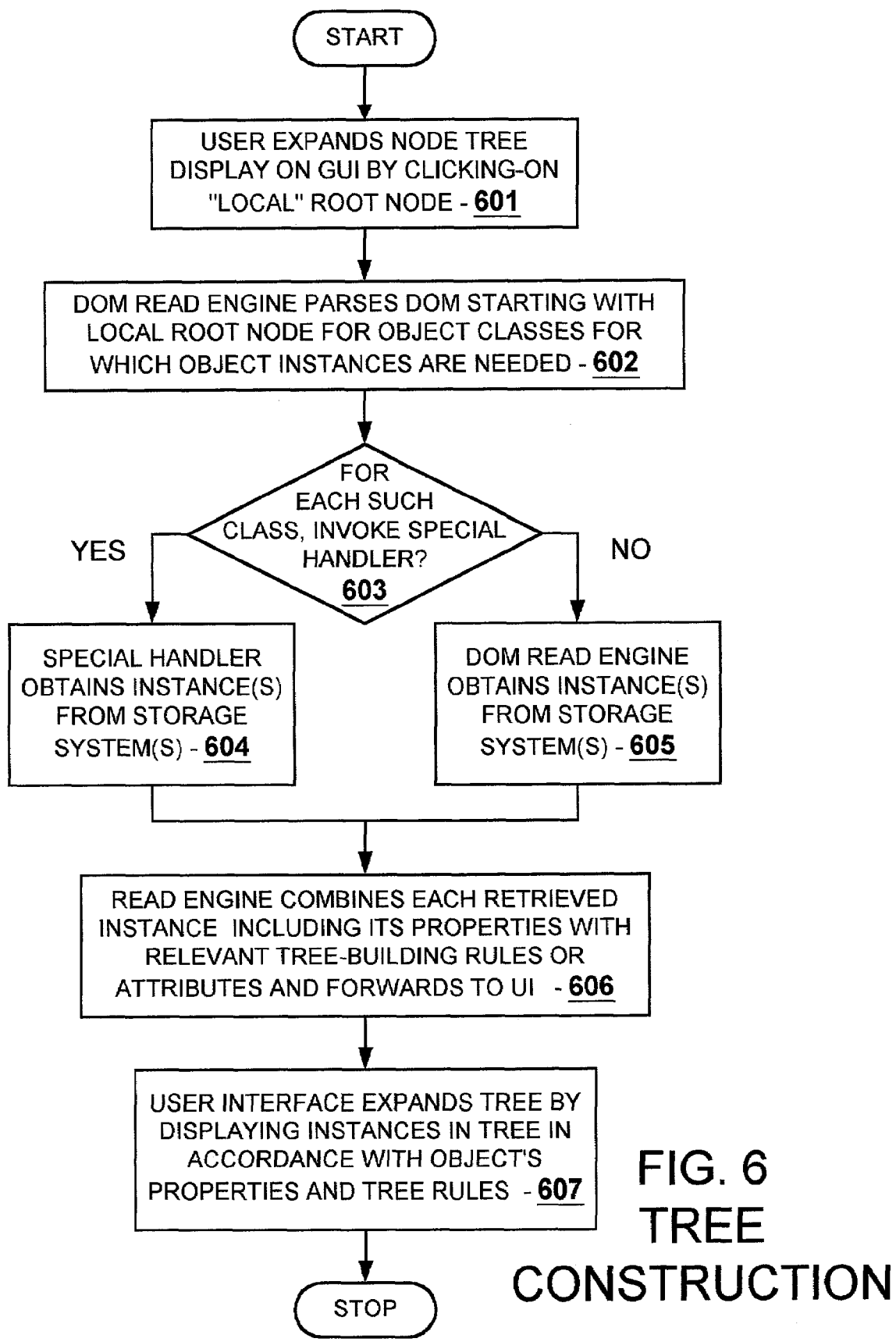

FIG. 6 is a flowchart depicting an algorithmic process for constructing a tree display on the GUI of FIG. 2 in accordance with principles of the present invention. The network user wishes to expand a node tree which is displayed on GUI 211. This node tree may be similar to that shown in FIG. 3. In block 601, the user clicks on a button displaying a positive (+) sign alongside an icon identifying one of the nodes which becomes the local root node for purposes of tree expansion thereunder. In other words, although such local root node may have a parent node, a grandparent node, and a great-grandparent node, etc. in the tree in which it is displayed, these "upstream" nodes are not germane to a user request for tree expansion below the local root node. For example, the user may click on button 303/304 of FIG. 3, thereby making LUNS the local root node for this tree expansion. In block 602, starting with the local root node, DOM read engine 206 parses DOM 207 which contains a composite merged file of tree building rules expressed as JAVA object classes. The algorithmic process moves to decision block 603.

In decision block 603 the query is posed: for each parsed node (for each parsed object class in the hierarchy starting with the local root node), is the special handler to be invoked? Invocation of special handler 214 results from parsing the nodes starting with the local root node and discovering each particular node having a particular attribute associated with it. This particular attribute is nodeBuilder with its associated value. Thus, if the answer is "yes" then a nodeBuilder attribute was found at a particular node at or under the local root node. The algorithmic process moves to block 604 where special handler 214 obtains the object instance(s) including their properties from storage systems 102, 103, and/or 104 over link 216 corresponding to the object class associated with this particular node located at or under the local root node in the DOM and specified by the nodeBuilder attribute. The retrieved object instance(s) is supplied over link 215 to DOM read engine 206 via tree-builder engine 205. This retrieval of object instances by the special handler is performed only for each such specified, particular node at or under the local root node.

However, if the answer to the query in decision block 603 is "no", then the process moves to block 605 where DOM read engine 206 obtains the object instance(s) including their properties from storage systems 102, 103, and/or 104 over link 213 via tree builder engine 205. There is a certain category of nodes located in the DOM hierarchy at or under the local root node for which these instances will be sought from the storage systems. As noted above, one group of nodes in this category are those obtained by the special handler. The remaining group of nodes in this category are those in the DOM which are specified by another attribute, namely: node enumerator with its associated value. In other words, as the relevant section of the DOM hierarchy under the local root node is being parsed, an object instance(s) for each of those nodes which is identified or specified by an attribute known as node enumerator is obtained by DOM read engine 206 from storage systems 102, 103, and/or 104 over link 213. Nodes located in the DOM hierarchy at or under the local root node which are not specified or identified by either of these two attributes are nodes for which object instances are not sought because they are not germane to construction of the particular tree display requested by the user (e.g., not germane to a particular display change such as a particular tree expansion requested by the user). At this point in the algorithmic process, where operations defined by blocks 604 and 605 are performed, all object instances (including their respective properties) which are needed by DOM read engine 206 for proper tree construction relative to the clicked-on local root node are obtained from the storage systems.

Next, the algorithmic process moves to block 606 where the read engine combines each retrieved instance including its properties with relevant tree-building rules or attributes, and forwards them to the user interface. Accordingly, the read engine obtains relevant object class attributes stored in certain nodes in the DOM. (These attributes or tree building rules were readily written into a basic XML file and readily modified by merging additional XML files with that file to form this DOM as earlier described). The read engine adds or packages or combines the retrieved object instances including their respective properties retrieved from storage systems 212 with, or in accordance with, the relevant tree building rules or attributes obtained from the DOM. The relevant tree building rules are those which are spelled out in the XML node definition stored in the DOM for the particular object instances being retrieved. In other words, the relevant tree building rules are those associated with children of the clicked-on, local root node rather than those associated with the local root node itself. Furthermore, other tree building rules for descendents, if any, of these retrieved object instances (i.e., any children of these instances and any children of those children etc.), may also be packaged with the aforementioned relevant tree building rules as a matter of convenience in a "placeholder" capacity. This would enable the GUI to easily further expand under any retrieved instance which is in the hierarchy under this particular local root node and which may subsequently be clicked-on by the user. In this example, where node 304 is the local root node, not only are attributes for its children LUN 1 and LUN 2 obtained from the DOM and provided to the GUI, but attributes for descendents of LUN 1 and LUN 2 are also obtained from the DOM and made available to the GUI, although the user may not wish those descendents displayed at this time. In such a case, those descendent attributes are held in a placeholder capacity for future convenient access by the GUI. (Further expanded tree 301B does not show children of LUN 1 but does show a child of LUN 2 being displayed as "disks").

At this stage, the object instances with their respective properties (e.g., object instance name, model number, state, capacity, etc.) are properly "packaged" with their respective tree-building rules or attributes (e.g., which icon to use, how to display the icon, what look to give the icon, what way to place it in the tree, etc.). The process moves to block 607 where the user interface receives this object, properties, and tree rules information from DOM read engine 206 over link 210 and utilizes it to display this object, or these objects in its expanded tree. As noted, if the user should wish to further expand under this particular root node, e.g., local root node 304 of FIG. 3, the GUI was provided with such further tree expansion information, e.g. how to expand LUN 1 if 305 should be clicked-on or how to expand DISKS if 307 should be clicked-on, etc.

The present embodiments are to be considered in all respects as illustrative and not restrictive. The rules files need not be written in XML but could be written in any other suitable object-oriented, text-based computer language. The merge and read engines and the DOM need not be written in JAVA but could be written in any other suitable object-oriented high level computer language compatible with the selected text-based language. The software need not be housed on the storage system, but could be housed in a dedicated server or possibly on the user interface itself. The present invention is applicable wherever a GUI screen display is employed and is not limited to presenting tree displays. Although a tree layout was utilized herein to provide a detailed tutorial of operation of the present invention and to exemplify principles of the present invention, other screen formats could have been used. For example, a map layout could have been used, where a map expansion would show ever-increasing map detail, perhaps as additional sub maps, as a function of which map icon was clicked-on. Or, as another example, pie charts having pie slice views with expandable detail per slice, could be readily adapted to be modified by embodiments of the present invention.

The method, system, and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a general purpose computer or processor, the machine becomes an apparatus for practicing the invention because the program code combines with the machine to provide a unique apparatus that operates analogously to operation of specific logic circuits. Methods and apparatus of the present invention may also be embodied in forms of program code that are transmitted over a transmission medium, such as over electrical wiring or cabling, through fiber optics, or via any other transmission medium.

Moreover, the flowcharts used herein to demonstrate various aspects of the invention should not be construed to limit the present invention to any particular logic flow or logic implementation. The described logic may be partitioned into different logic blocks, (e.g., programs, modules, functions, or subroutines) without changing the overall results or otherwise departing from the true scope of the invention. The present invention may be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program many be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, pre-loaded with a computer system (e.g. on system ROM or fixed disk), or distributed from a server or electronic bulletin board over the communication system (e.g., the Internet or World Wide Web).

Therefore, the scope of the invention is indicated by the appended claims rather than by the foregoing description, and all changes which come within the meaning and range of equivalency of the claims are therefore intended to be embraced therein.

What is claimed is:

1. In a computer network including at least a computer memory and a graphical user interface (GUI) including GUI code for displaying one of a node tree, a node map and a node pie chart, a method for enabling a code developer to readily modify appearance of said one of said node tree, said node map and said node pie chart, respectively, said method comprising:

establishing a document object model (DOM) in said memory from a single basic rule file, said rule file including features and enabling said appearance;

establishing a plurality of different rule files functionally isolated from said DOM said plurality of different rule files being established in an ordered sequence wherein each one of said different rule files includes said basic rule file and all content of all previous ones of said different rule files;

receiving, into each of said plurality of rule files, modification to said one of said node tree, said node map and said node pie chart, respectively, from said developer as particular code;

establishing a merge engine functionally isolated from said DOM;

parsing said particular code from at least one of said different rule files in said merge engine to obtain at least one of said different rule files parsed particular code;

said merge engine writing a representation of said at least one of said different rule files parsed particular code into said DOM as merged tree rules, merged map rules or merged pie chart rules, respectively;

determining certain of said merged tree rules, said merged map rules or said merged pie chart rules, respectively to be read;

obtaining particular node information in accordance with said certain of said merged tree rules, said merged map rules or said merged pie chart rules, respectively; and, supplying said particular node information to said GUI to modify said appearance of said one of said node tree, said node map and said node pie chart, respectively in accordance with said certain of said merged tree rules, said merged map rules or said merged pie chart rules, respectively;

wherein said particular code is written in XML and said GUI code is written in a non-XML, object-oriented computer language.

2. The method of claim 1 and wherein said DOM is manifested in said non-XML, object-oriented computer language.

3. The method of claim 2 further comprising:
providing a special case handler;
said certain of said merged tree rules including an attribute invoking said special case handler; and,
obtaining said particular node information by way of said special case handler.

4. The method of claim 3 and wherein code for said special case handler is written in said non-XML, object-oriented computer language.

5. The method of claim 1 further comprising:
providing a special case handler;
said certain of said merged tree rules including an attribute invoking said special case handler; and,
obtaining said particular node information by way of said special case handler.

6. A method for controlling a user display capable of displaying subsets of a plurality of objects, said display based on both underlying fixed code structure in a non-XML, object-oriented computer language and modifiable rules which operate with said fixed code structure to change said display, said method comprising:
establishing a document object model (DOM) from a single basic rule file, said file including features and enabling said display;
establishing, in a plurality of rules files functionally isolated from said DOM and in an ordered sequence wherein each one of said rules files includes said basic rule file and all content of all previous ones of said rules files, a plurality of said rules governing relationships between each of said plurality of objects and certain of said plurality of objects;
determining, at least through operation of said DOM, certain of said plurality of rules to be used in effectuating said change;
responsive to said determining, retrieving other certain of said plurality of objects; and,
using said non-XML, object-oriented computer language, presenting said other certain of said plurality of objects in said non-XML, object-oriented computer language to said user display in a manner to effectuate said change.

7. The method of claim 6 further comprising:
modifying said plurality of rules in a manner to effect operation of said retrieving to retrieve yet other certain of said plurality of objects; and,
presenting said yet other certain of said plurality objects to said display in a different manner to effectuate a different change.

8. The method of claim 7 and wherein said rules establishing comprises:
establishing at least a basic XML file containing said plurality of rules;
establishing a merge engine functionally isolated from said DOM, and,
said merge engine converting said plurality of rules into a representation of each of said plurality of rules and writing said representation into said document object model.

9. The method of claim 8 further comprising:
providing additions, deletions, and/or modifications to at least a portion of said plurality of rules contained in said basic file in additional XML files in ordered sequence;
converting and merging each one of said additional XML files with said representation sequentially to obtain a plurality of merged files in a manner that only said additions, deletions and/or modifications to said each one of said additional XML files is merged with the immediately previous one of said plurality of merged files starting with said basic file and continuing with said each one of said additional XML files in said ordered sequence until all said additional XML files have been merged into a composite merged file.

10. The method of claim 8 and wherein said certain rules determining comprises:
receiving a request from a user;
reading said representation; and,
comparing said request with said representation of said plurality of rules to obtain a representation of said certain of said plurality of rules.

11. The method of claim 10 and wherein said other certain of said objects retrieving comprises:
calling one of said other certain of said objects.

12. The method of claim 11 and wherein said calling further comprises:
directly obtaining said one of said other certain of said objects if said certain of said plurality of rules is specified by a first attribute;
providing a special case handler; and,
invoking said special case handler to obtain said one of said other certain of said objects if said certain of said plurality of rules is specified by a second attribute.

13. A method for making modification to a GUI controlling a display of no greater than a first plurality of objects, said display being based on underlying code structure as modified by rules stored in a composite merged file, said modification being made by modifying said rules without modifying said underlying code structure, said method comprising:
establishing a document object model (DOM) from a single basic rule file, said file including features and enabling said display;
establishing a second plurality of rule files functionally isolated from said DOM in an ordered sequence wherein each one of said rule files includes said basic rule file and all content of all previous ones of said rule files;
establishing in said ordered sequence in a first language a like second plurality of different sets of rules governing relationships between certain of said first plurality of objects, each one of said sets of rules contained respectively within one of said second plurality of rule files in said ordered sequence;
converting said like second plurality of different sets of rules from said first language to respective sets of non-XML, object-oriented computer language representations of said like second plurality of different sets of rules;
writing each of said sets of non-XML, object-oriented computer language representations into said document object model; and,
merging the next successive one of said each of said sets of non-XML, object-oriented computer language representations with said each of said sets of JAVA language representations until all of said sets of non-XML, object-oriented computer language representations have been merged into said composite merged file;

whereby, after performing said converting, said writing and said merging, said modification is made to said GUI in said non-XML, object-oriented computer language without modifying said underlying code structure.

14. The method of claim 13 and wherein said first language is XML.

15. A method for controlling a user GUI display comprising:
  establishing a document object model (DOM) from a single basic rule file, said file including features and enabling said display;
  providing a plurality of files functionally isolated from said DOM in an ordered sequence wherein each one of said files includes said basic rule file and all content of all previous ones of said files;
  writing modifiable display rules into said plurality of files;
  reading each one of said files to obtain a corresponding converted file in a non-XML, object-oriented computer language and merging each said corresponding converted file with its immediately previous said converted file into said DOM to obtain a composite merged file in said non-XML, object-oriented computer language;
  reading said composite merged file to obtain certain of said rules controlling change to said display; and,
  supplying at least said certain of said rules to said GUI in said non-XML, object-oriented computer language to control said change to said display.

16. The method of claim 15 and wherein:
  said plurality of files are XML files;
  said display is selected to be a node tree display;
  said change is an expansion to the tree of said tree display from a local root node in said tree display; and,
  said certain of said rules correspond to objects stored in said DOM located in positions selected from the group of positions consisting of those corresponding to said local root node and to descendents of said local root node.

17. A computer program product for making modification to a GUI controlling a display of no greater than a first plurality of objects, said display being based on underlying code structure as modified by rules stored in a composite merged file, said modification being made by modifying said rules without modifying said underlying code structure, said computer program product including a machine-readable storage medium having computer readable program code thereon, said computer program code comprising:
  program code for establishing a document object model (DOM) from a single basic rule file, said file including features and enabling said display;
  program code for establishing a second plurality of rule files functionally isolated from said DOM in an ordered sequence wherein each one of said rule files includes said basic rule file and all content of all previous ones of said rule files;
  program code for establishing in said ordered sequence in a first language a like second plurality of different sets of rules governing relationships between certain of said first plurality of objects, each one of said sets of rules contained respectively within one of said second plurality of rule files in said ordered sequence;
  program code, operative in said ordered sequence, for converting said like second plurality of different sets of rules from said first language to respective sets of non-XML, object-oriented computer language representations of said like second plurality of different sets of rules;
  program code, operative concurrently with operation of said converting program code, for writing each of said sets of non-XML, object-oriented computer language representations into said document object model; and,
  program code for merging the next successive one of said each of said sets of non-XML, object-oriented computer language representations with said each of said sets of non-XML, object-oriented computer language representations until all of said sets of non-XML, object-oriented computer language representations have been merged into said composite merged file;
  whereby, after execution of said program code for converting, said program code for writing and said program code for merging, said modification is made to said GUI in said non-XML, object-oriented computer language without modifying said underlying code structure.

18. The computer program product of claim 17 and wherein said first language is XML.

19. A computer program product for controlling a user GUI display, said computer program product including a machine-readable storage medium having computer readable program code thereon, said program code comprising:
  program code for establishing a document object model (DOM) from a single basic rule file, said file including features and enabling said display;
  program code for establishing a plurality of files in XML functionally isolated from said DOM in an ordered sequence wherein each one of said files includes said basic rule file and all XML statements of all previous ones of said files;
  program code for writing modifiable display rules in XML into said plurality of files;
  program code, operative in the order in which said files were written, for both reading each one of said files to obtain a corresponding converted file in a non-XML, object-oriented computer language and merging each said corresponding converted file with its immediately previous said converted file into said DOM to obtain a composite merged file in said non-XML, object-oriented computer language;
  program code, responsive to said user requesting change to said display, for reading said composite merged file to obtain certain of said rules controlling change to said display; and,
  program code for supplying at least said certain of said rules to said GUI in said non-XML, object-oriented computer language to control said change to said display.

20. The computer program product of claim 19 and wherein:
  said display is selected to be said node tree display;
  said change is an expansion to the tree of said tree display from a local root node in said tree display; and,
  said certain of said rules correspond to objects stored in said DOM located in positions selected from the group of positions consisting of those corresponding to said local root node and to descendents of said local root node.

21. A system for controlling a user GUI display comprising:
  a document object model (DOM) established from a single basic rule file, said file including features and enabling said display;

a plurality of files functionally isolated from said DOM and prepared in an ordered sequence wherein each one of said files includes said basic rule file and all content of all previous ones of said files;

system component for writing modifiable display rules into said plurality of files;

system component, operative in the order in which said files were written, for both reading each one of said files to obtain a corresponding converted file in a non-XML, object-oriented computer language and merging each said corresponding converted file with its immediately previous said converted file into said DOM to obtain a composite merged file in non-XML, object-oriented computer language;

system component, responsive to said user requesting change to said display, for reading said composite merged file to obtain certain of said rules controlling change to said display; and, system component for supplying at least said certain of said rules to said GUI in said non-XML, object-oriented computer language to control said change to said display.

22. The system of claim 21 and wherein:

said plurality of files are XML files;

said display is selected to be said node tree display;

said change is an expansion to the tree of said tree display from a local root node in said tree display; and, said certain of said rules correspond to objects stored in said DOM located in positions selected from the group of positions consisting of those corresponding to said local root node and to descendents of said local root node.

23. A method for modifying a GUI node tree display, said method comprising the following steps starting with step (a):

(a) providing a single basic rule file including features, said file constructed as a hierarchy of nodes and containing code for use in controlling said GUI to provide said tree display;

(b) providing additional rule files in an ordered sequence wherein each one of said additional rule files includes said basic rule file and all content of all previous ones of said additional rule files, each one of said additional rule files being constructed similarly to said basic rule file and containing additional code for use in controlling said GUI to modify said tree display, certain of said additional rule files to be merged with said basic rule file to obtain a merged basic rule file;

(c) for each one of said additional rule files, parsing said additional code for nodes that contain a particular XML attribute;

(d) for each one of said nodes containing said attribute, determining if there is a matching attribute in a node in said basic rule file or said merged basic rule file at a tree depth of said hierarchy equal to tree depth of said one of said nodes;

(e) if said matching attribute is not found, merging said one of said nodes at said tree depth into said basic or said merged basic file to obtain a composite merged file;

(f) writing said composite merged file into a document object model (DOM) in memory; and (g) using said DOM to modify said tree display.

24. The method of claim 23 further comprising:

(h) if said matching attribute is found, determining if there are other attributes for said one of said nodes in said additional rule file;

(i) if there are said other attributes, determining if any of said other attributes are different from attributes at said tree depth in said basic rule file or said merged basic rule file; and (j) if said any of said other attributes are not different from said attributes at said tree depth in said basic rule file or said merged basic rule file, not merging said any of said other attributes that are not different from said attributes.

25. The method of claim 24, further comprising:

(k) if said any of said other attributes are different from said attributes at said tree depth in said basic rule file or said merged basic rule file, merging said any of said other attributes into said basic file or said merged basic file to obtain said composite merged file.

26. The method of claim 24, further comprising:

(l) if there are not said other attributes, determining if there are any child nodes of said one of said nodes containing said attribute; and (m) if there are said any child nodes of said one of said nodes containing said attribute, repeating steps (d)-(m) in the order given.

27. The method of claim 23 wherein nodeId="_" is said particular XML attribute, where "_" is value of said particular attribute.

28. The method of claim 27 wherein said value of said particular attribute is selected from the group of values consisting of: Storage Systems Folder, Subsystem, LUNs Folder, LUN, Disks Folder, Clones Folder, and Physical Folder.

29. A computer program product for modifying a GUI node tree display, said computer program product including a machine-readable storage medium having computer readable program code thereon, said computer program code comprising:

program code (a) for providing a single basic rule file including features, said file constructed as a hierarchy of nodes and containing code for use in controlling said GUI to provide said tree display;

program code (b) for providing additional rule files in an ordered sequence wherein each one of said additional rule files includes said basic rule file and all content of all previous ones of said additional rule files, each one of said additional rule files being constructed similarly to said basic rule file and containing additional code for use in controlling said GUI to modify said tree display, certain of said additional rule files to be merged with said basic rule file to obtain a merged basic rule file;

for each one of said additional rule files, program code (c) for parsing said additional code for nodes that contain a particular XML attribute;

for each one of said nodes containing said attribute, program code (d) for determining if there is a matching attribute in a node in said basic rule file or said merged basic rule file at a tree depth of said hierarchy equal to tree depth of said one of said nodes;

if said matching attribute is not found, program code (e) for merging said one of said nodes at said tree depth into said basic or said merged basic file to obtain a composite merged file;

program code (f) for writing said composite merged file into a document object model (DOM) in memory; and program code (g) for using said DOM to modify said tree display.

30. The computer program code of claim 29 further comprising:
- if said matching attribute is found, program code (h) determining if there are other attributes for said one of said nodes in said additional rule file;
- if there are said other attributes, program code (i) for determining if any of said other attributes are different from attributes at said tree depth in said basic rule file or said merged basic rule file; and
- if said any of said other attributes are not different from said attributes at said tree depth in said basic rule file or said merged basic rule file, program code (j) for not merging said any of said other attributes that are not different from said attributes.

31. The computer program code of claim 30, further comprising:
- if said any of said other attributes are different from said attributes at said tree depth in said basic rule file or said merged basic rule file, program code (k) for merging said any of said other attributes into said basic file or said merged basic file to obtain said composite merged file.

32. The computer program code of claim 30, further comprising:
- if there are not said other attributes, computer program code (l) for determining if there are any child nodes of said one of said nodes containing said attribute; and
- if there are said any child nodes of said one of said nodes containing said attribute, program code (m) for re-running program codes (d)-(m) in the order given, subject to any respective condition associated with each of said program codes (d)-(m).

33. The computer program code of claim 29 wherein nodeId="_" is said particular XML attribute, where "_" is value of said particular attribute.

34. The computer program code of claim 33 wherein said value of said particular attribute is selected from the group of values consisting of:
Storage Systems Folder, Subsystem, LUNs Folder, LUN, Disks Folder, Clones Folder, and Physical Folder.

35. A method, comprising:
- establishing a document object model (DOM) of rules from a single basic rule file, said file enabling a user interface display and including features for said display;
- thereafter, establishing an ordered sequence of different rule files, each one of said different rule files including all content of all previous ones of said rule files and content of said basic rule file;
- reading said each one of said different rule files in said ordered sequence to obtain a representation of said each one of said different rule files;
- writing each said representation in said ordered sequence into said DOM and thereby merging said each said representation with each previous said representation to obtain a sequentially-merged composite representation of said each one of said different rule files; and
- utilizing each one of said sequentially-merged composite representations to modify said display in said ordered sequence.

36. A computer program product for making modification to a user interface, said computer program product including a machine-readable storage medium having computer readable code thereon, said computer program code comprising:
- program code for establishing a document object model (DOM) of rules from a single basic rule file, said file enabling a user interface display and including features for said display;
- program code for establishing an ordered sequence of different rule files, each one of said different rule files including all content of all previous ones of said rule files and content of said basic rule file;
- program code for reading said each one of said different rule files in said ordered sequence to obtain a representation of said each one of said different rule files;
- program code for writing each said representation in said ordered sequence into said DOM and thereby merging said each said representation with each previous said representation to obtain a sequentially-merged composite representation of said each one of said different rule files; and
- program code for utilizing each one of said sequentially-merged composite representations to modify said display in said ordered sequence.

* * * * *